March 27, 1934.    H. D. ALLEE    1,952,484
GASOLINE TANK FILLER
Filed June 6, 1932
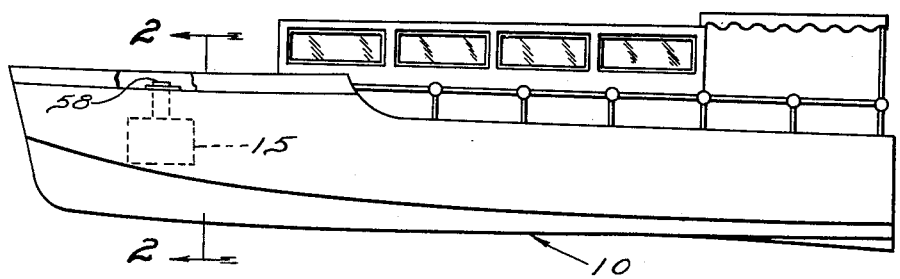
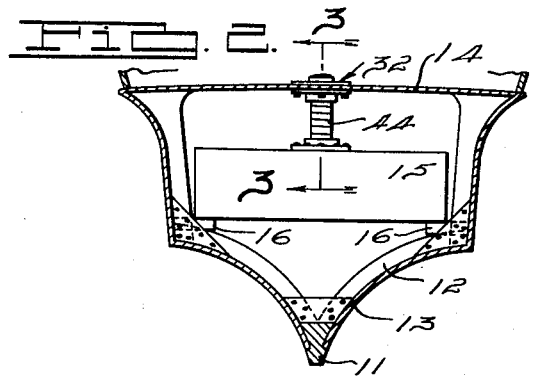
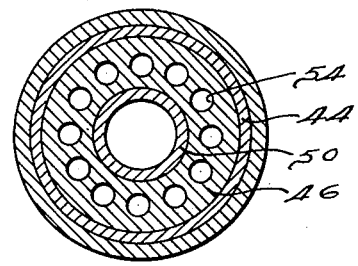
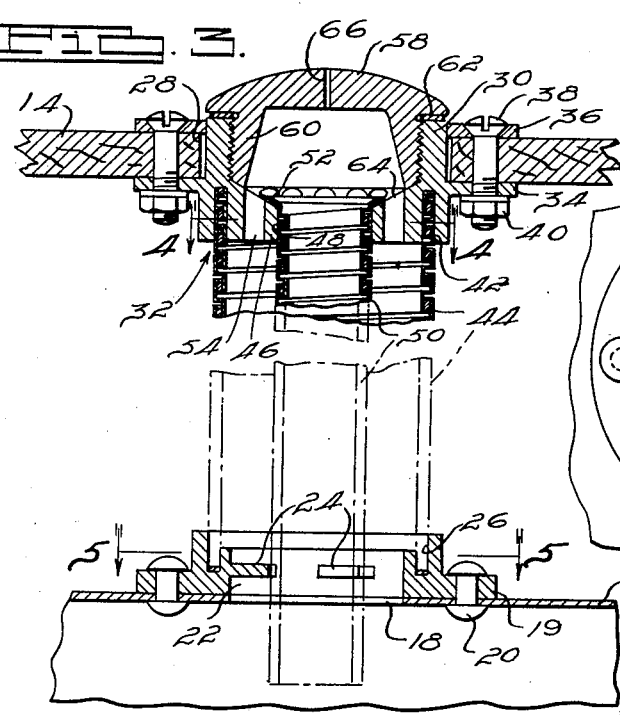
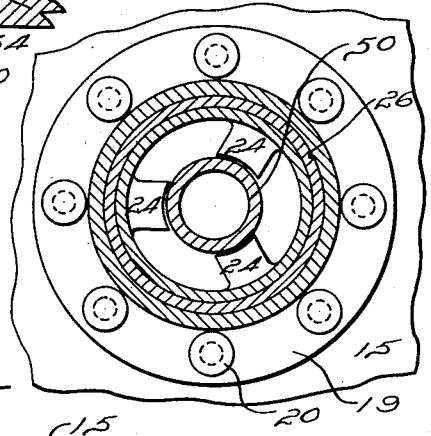
INVENTOR
Herbert D. Allee.
BY
Harness, Dickey, Pierce & Hann
ATTORNEYS.

Patented Mar. 27, 1934

1,952,484

UNITED STATES PATENT OFFICE 1,952,484

GASOLINE TANK FILLER

Herbert D. Allee, Detroit, Mich.

Application June 6, 1932, Serial No. 615,494

3 Claims. (Cl. 114—.5)

This invention relates to fuel tank filling devices for power boats, and particularly to such devices as are employed in connection with those constructions wherein the filler opening into which the fuel is fed to the tank is located a material distance from the tank, the principal object being the provision of a device of this type that is simple in construction and economical to produce.
Another object is to provide a construction of the type described which will be capable of withstanding the racking and weaving of the boat hull, as for instance due to a rough sea, without placing the connection or the parts which it connects, under any undue strain, or affecting the operativeness thereof.

Other objects are to provide a device of the character described including a filler opening element and a tank element carried by different parts of a boat structure and connected to each other by a flexible tube; to provide such a structure in which novel means are provided for carrying off air in the tank displaced by fuel being fed thereto and without interfering with the free flow of fuel to the tank; to provide a construction of the type described including separate fuel vent passages both of which are provided with a common closure member; to provide a filler construction for fuel tanks embodying a pair of spaced tubes, one of which is located within the other and spaced therefrom whereby to provide both a fuel passage and a vent passage; and to provide a construction of the type described having certain novel features of construction that will be specifically pointed out or will be apparent in the following specification.

The above being among the objects of the present invention, the same consists in certain novel features of construction and combinations of parts to be hereinafter described with reference to the accompanying drawing, and then claimed, having the above and other objects in view.

In the accompanying drawing, which illustrates one suitable embodiment of the present invention, and in which like numerals refer to like parts throughout the several different views:

Figure 1 is a partially broken side elevational view of a power boat of the cruiser type;
Fig. 2 is an enlarged, vertical sectional view taken in a plane perpendicular to the length of the boat as on the line 2—2 of Fig. 1, and showing the fuel tank provided with a filler device constructed in accordance with the present invention;

Fig. 3 is a still further enlarged vertical sectional view taken axially through the filler device as on the line 3—3 of Fig. 2, fragments of the deck of the boat and the fuel tank being shown in connection therewith;

Fig. 4 is a horizontal sectional view taken on the line 4—4 of Fig. 3; and

Fig. 5 is a horizontal sectional view taken on the line 5—5 of Fig. 3.

In motor boats of the larger type such as, for instance, those commonly known as cruisers, it is conventional practice to place the fuel tank as near the keel of the boat as possible in order to lower the center of gravity of the boat and, consequently, because of the usual depth of the hulls of such boats it is necessary to extend a duct from the fuel tank to some point as on the deck of the boat in order to provide a ready means of filling the tank with fuel. In the past it has been common practice to simply extend a solid pipe from the fuel tank to a suitable fitting in the deck which is provided with a closure of any suitable type. The closure in some cases is itself vented in order to permit the fuel drawn out of the tank during operation of the motor to be replaced by an equal volume of air, and in other cases a separate pipe, usually of smaller diameter but of solid construction, has been extended between the top of the tank and some exterior surface of the boat not only to permit the escape of air from the tank during the filling of the tank but also to replace the fuel withdrawn from the tank during operation of the motor with a like amount of air. This latter construction is preferable to that first described for the reason that the escape of air through a separate pipe does not interfere with the fuel flowing into the tank during the filling operation as occurs in the first mentioned construction.

In any case the fuel tank is secured to and supported by the frame members of the hull at or adjacent the bottom thereof and the filler opening end of the connection is supported by the deck or in a position proximate thereto. As is well known by those skilled in the art, when a boat of this type encounters heavy sea which exerts twisting, bending and other forces on the hull, the hull actually gives under such forces and is caused to weave. In other words, a relative movement is caused between different parts of the hull and particularly between the bottom of the boat and the deck. Accordingly, where the conventional fuel tank filling device embodying rigid connecting members is incorporated in a boat that is weaving, such filler connection, because of its rigid construction, is subjected to a considerable strain which is, of course, also transmitted to the filler opening member and to the fuel tank. The result is that the solid tube is often ruptured or broken, the filler opening member is sometimes torn loose from the deck, and sometimes the fuel tank itself is ruptured adjacent its point of connection with the tube, or torn loose from its supports.

The same relative movement of course occurs in connection with the separate breather tube when employed and constructed of solid tube as previously described. In either case, should either one of the tubes break or be ruptured or if the fuel tank itself becomes ruptured, fumes from the fuel, and oftentimes the fuel itself, escapes into the interior of the hull where it constitutes serious fire and other hazards. The present invention, which will now be described, has been designed particularly to eliminate such hazards as well as to provide a cheap and an efficient construction.

Referring now to the drawing, I show a boat indicated generally as at 10, of the cruiser type. As indicated in Fig. 2 the hull of the boat may include the usual keel 11, frame members 12, planking 13 and deck 14. A fuel tank 15 may be supported on and secured to brackets such as 16, in turn secured to the frame members 12, in any suitable manner, but preferably so that weaving of the hull will not subject the tank itself to any undue strain.

As indicated best in Figure 3 the tank 15 is provided in its upper surface with an opening 18. A flanged collar 19 is secured and sealed to the outer surface of the tank 15 about the opening 18 by means of rivets 20 or other suitable means. The collar 19 is provided with a central opening 22 of a diameter corresponding with the diameter of the opening 18 and interiorly thereof is provided with a plurality of inwardly projecting fingers 24 which stop short of the center of the opening. The collar 19 is also provided with an upwardly opening annular recess 26 therein, the purpose of which will be presently described.

The deck 14 is provided with an opening 28 therein, and while this opening may be positioned in any convenient location relative to the fuel tank 15, it is shown in the present instance as directly above the opening 18 for the purpose of simplicity in description and drawing. Within the opening 28 and projecting upwardly therethrough is the internally threaded collar portion 30 of a filler opening member indicated generally as at 32 and which is provided with a radially outwardly extending flange 34 which is shown as abutting the under side of the deck 14. A clamping ring 36 surrounds the collar 30 above the upper surface of the deck 14 and screws 38 extend downwardly through the collar 36 and deck 14 and flange 34, on the under side of which they are provided with nuts 40 for the purpose of rigidly securing the filler opening member 32 to the deck.

The lower face of the member 32 is provided with a downwardly opening annular recess 42 therein, this recess being of the same diameter as the recess 26 in the collar 19. The recesses 42 and 26 receive opposite ends of a flexible conduit 44 which extends between the collar 19 and the member 32, the ends of the conduit being received in their respective recesses and preferably soldered or brazed, where of metal construction, or otherwise secured therein. The conduit 44 may be of any suitable type now found on the market but where it is of the spiral metal type shown it is preferably such as to be capable of carrying the fuel without an appreciable amount of leakage.

The lower portion of the member 32 is extended inwardly as at 46 to provide a central circular opening 48 in which is received the upper end of another flexible tube 50 which is suitably secured therein, as for instance by outwardly flaring and brazing its upper end as at 52 where it is formed of the metal type indicated. The tube 50 extends downwardly through the tube 44 in spaced relation thereto and into the interior of the fuel tank 15 to a point preferably below the top of the tank as indicated, the fingers or lugs 24 previously described in connection with the collar member 19 serving to hold it centrally of the opening 22 therein at the point where it projects therethrough. The space between the fingers 24 provides free communication between the air in the upper part of the tank 15 and the space between the tubes 44 and 50.

Between the upper ends of the tubes 44 and 50 the inwardly extending portion 46 of the member 32 is provided with a series of openings 54 which thus afford free and unrestricted communication between the upper face thereof and the space between the tubes 44 and 50 and consequently the upper part of the tank 11.

A closure member 58 is provided on its lower face with an axially extending externally threaded collar portion 60 which is received in and cooperates with the internal threads on the collar 30. The cover member 58 may be sealed to the member 32 in any suitable manner as for instance by a gasket 62, or by beveling off the upper face of the portion 46 as indicated at 64 and correspondingly beveling the lower edge of the collar 60 on the cap 58 to cooperate therewith to form a seal. The lower edge of the collar portion 60 of the cap 58, preferably does not completely close the openings 54. The cap 58 is also provided with a vent opening 66 to permit air to enter the fuel tank 15 to replace so much of the fuel as is withdrawn from the tank 15 during operation of the motor for the boat.

When it is desired to fill the tank 15 the cap 58 is removed and a funnel, or a nozzle of a filler hose, is inserted into the upper end of the tube 50 and the fuel is introduced thereinto. The fuel accordingly flows downwardly into the tank through the tube 50 and the air in the tank that is displaced thereby passes upwardly through the space between the tubes 44 and 50 and through the openings 54 where it escapes to the atmosphere. In practice, the combined cross-sectional area of the openings 54 is preferably approximately equal to the cross-sectional area of the tube 50 so that there will be no appreciable restriction to the escape of such air during the filling operation and which otherwise might interfere with the free flow of fuel through the tube 50 into the tank.

When the cap 58 is in place the upper ends of the tubes 44 and 50 are effectively sealed from the entrance of foreign matter except through the vent opening 56 in the cap which is so small as to be disregarded as far as the entrance of dust and dirt therethrough is concerned. Accordingly it will be apparent that with this construction, all connection between the filler opening member 32 and the flange 19 on the fuel tank is through flexible members and accordingly any relative movement between the members 19 and 32 during weaving of the boat will not set up any strain in these members or the connections between them, and as a result thereof this construction will remain operative for an indefinite length of time and eliminate the hazards of conventional constructions.

It may also be noted that with the construction disclosed, the connections between the flexible tubes 44 and 50 and the members at either end thereof which they connect may be made permanent before the fuel tank is ever positioned in the boat and accordingly it forms with the tank a unitary assembly applicable to and removable from the boat as such.

Although but one specific illustration of the present invention has been shown in the accompanying drawing, various changes and modifications thereof will be apparent to those skilled in the art and accordingly it will be understood that formal changes may be made in the specific embodiment of the invention described without departing from the spirit or substance of the broad invention, the scope of which is commensurate with the appended claims.

I claim:

1. In combination with a boat having a bottom framework and a deck thereabove, said framework and deck being subject to relative weaving and other movements in service, a fuel tank supported by said framework below said deck, a filler opening member secured to said deck above said tank and including a central filler opening and outer air escapement openings, an apertured connection member secured to said tank, a flexible tube sealed to said filler member so as to embrace both said filler and escapement openings and sealed to said connection member, a second flexible tube concentrically positioned in spaced relation to the first-mentioned tube sealed to said filler member between said filler and escapement openings therein and projecting into said tank, said filler member including a cylindrical body portion having radially outwardly projecting flange means below the top thereof, said body portion projecting through an opening in said deck, and means for drawing said flange means into contact with the under side of said deck.

2. In combination with a boat having a bottom framework and a deck subject to weaving relative to each other in service, a fuel tank supported by said framework below said deck, a filler opening member secured to said deck above said tank, and a flexible tubing connecting said tank and member, said tank, member and tube constituting a unitary assemblage applicable to and removable from said boat as such.

3. In combination with a boat having a bottom framework and a deck thereabove, said framework and deck being subject to relative weaving and other movements in service, a fuel tank supported by said framework below said deck, a filler opening member secured to said deck above said tank and including a central filler opening and outer air escapement openings, a flexible tube sealed to said member so as to embrace both said filler and escapement openings and sealed to said tank in open communication therewith, and a second flexible tube concentrically positioned in spaced relation to the first-mentioned tube sealed to said member between said filler and escapement openings therein and projecting into said tank, said tank, member and tubes constituting a unitary assemblage applicable to and removable from said boat as such.

HERBERT D. ALLEE.